Patented June 7, 1932

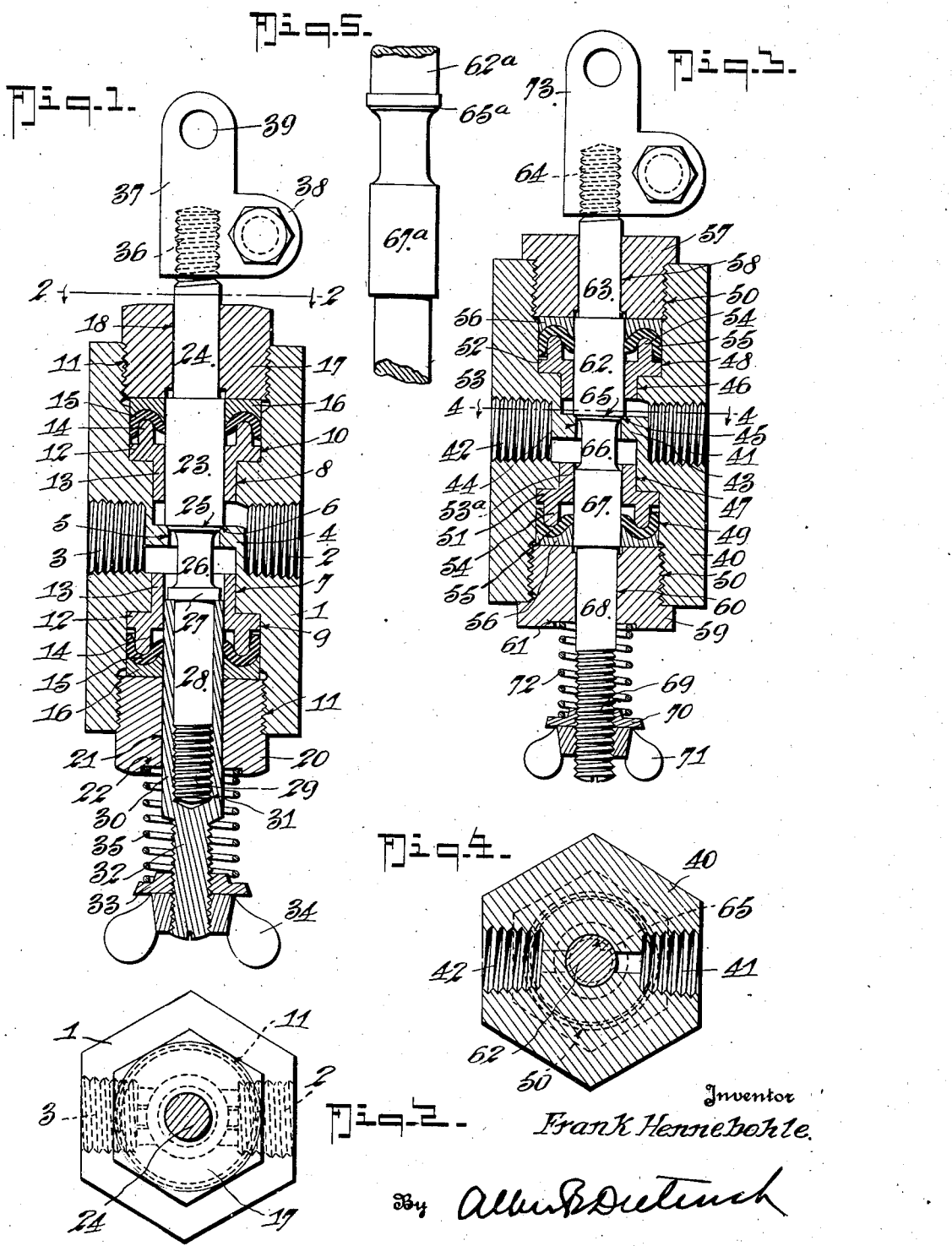

1,861,916

UNITED STATES PATENT OFFICE

FRANK HENNEBÖHLE, OF CHICAGO, ILLINOIS

BALANCED QUICK OPERATING VALVE

Application filed May 18, 1931. Serial No. 538,374.

My invention relates to the art of valves and it particularly has reference to valves for controlling the passage of viscous liquids at high pressure passing through conduits.

Primarily, the invention seeks to provide a simple, inexpensive valve which can be opened and closed with a minimum effort and yet, when closed, will effectively cut off the flow of liquid.

Further, it is an object to provide a valve capable of holding liquids at pressures of five thousand pounds or more without leakage around the stems of the valve.

Further, it is an object of the invention to provide a balanced quick acting valve in which those parts subject to deterioration or wear may be readily replaced when necessary.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a vertical section of one embodiment of the invention.

Figure 2 is a horizontal section on the line 2—2 of Figure 1.

Figure 3 is a vertical longitudinal section of another embodiment of the invention.

Figure 4 is a cross section on the line 4—4 of Figure 3.

Figure 5 is a detail view of a modification hereinafter referred to.

In the drawing, 1 represents a valve body preferably of angular cross section, hexagon form being shown in the drawing. The valve body has an inlet opening 2 and an outlet opening 3 threaded for connection in the pipe line, the openings being separated by a web 4 having a fluid passage 5 located at right angles to the axes of the openings 2 and 3. A bevelled valve seat 6 is provided at the inlet edge of the passage 5.

7 and 8 indicate co-axial longitudinal bores entering from the ends of the body 1 at right angles to the axis of the openings 2 and 3 coincident with the axis of the fluid passage 5. The bores 7 and 8 are counterbored as at 9 and 10 and these counterbores have their ends internally threaded as at 11.

Stem guides 12 are inserted in the bores and counterbores and comprise sleeves 13 which lie in the portion of the bore of lesser diameter and annular washer holding rings 14 which lie in the portion of greater diameter of the bores. The rings 14 carry U-shaped leather washers 15 which are held in place by washer followers 16 and the collar nuts 17 and 20 respectively.

The collar nut 17 is bored at 18 for the operating stem 24 of the valve piston 23 while the nut 20 is bored at 21 for the reception of the auxiliary tubular stem 30. The collar nut 20 is also provided with a spring seat 22 to receive the coil spring 35 which engages a spring disk 33 on the reduced threaded outer end 32 of the auxiliary tubular stem 30 and is held in adjusted position by a wing nut 34.

The valve piston 23 has a bevelled seating surface or valve face 25. The valve piston 23 is provided with a connecting neck 26 that carries a guide 27 from which projects the reduced stem 28 whose end 29 is threaded into the auxiliary tubular stem 30 so that the parts 30 and 28 may be rigidly secured together in assembling the valve structure, the auxiliary stem 30 having internal threads 31 for co-operation with the threaded end 29 of the reduced stem 28. The operating stem 24, valve piston 23, connecting neck 26, guide 27, reduced stem 28, and tubular stem 30, together constitute a substantially rod-like valve unit.

On the operating stem 24 is mounted any suitable means by which the valve may be opened and closed. This means may be a connection with the armature of an electromagnet (not shown) or a connection with a lever by means of which the valve may be moved longitudinally. The connection may be made through the medium of a connector 37 having an opening 39 to which the operating instrumentality may be connected and having a split clamp 38 internally threaded to receive the threaded end 26 of the operating stem 24.

The above description applies to the first embodiment of the invention.

The second embodiment illustrated in Figures 3 and 4 involves a valve body 40 having an inlet opening 41, an outlet opening 42, a web 43 with fluid passage 44 and bevelled valve seat 45. It also has the co-axial bores 46 and 47 counterbored at 48 and 49 respectively, the counterbores having the threaded ends 50 as shown.

Stem guides 51 and 52 respectively are located in the bores and counterbores and have sleeve portions 53, 53ª respectively, and annular washer holding members 54 for the U-shaped leather washers 55, the same being held in place by washer followers 56 and collar nuts 59 and 57 respectively.

The collar nut 57 has a bore 58 for the operating stem 63 of the valve, and the collar nut 59 has a bore 60 for the reduced stem 68 of the valve. The collar nut 59 also has a spring seat 61 for the spring 72 held by means of a wing nut 71 and spring disk 70 on the threaded end 69 of the reduced stem 68.

62 designates the valve piston whose operating stem 63 carries the operating connector 73 which may be constructed the same as the connector 37 in the preceding embodiment of the invention and mounted on the threaded end 64 of the stem.

65 is the bevelled face of the valve piston 62, and 66 is a connecting neck which joins the valve piston 62 to the guide piston 67 from which the reduced stem 68 projects. The operating stem 63, valve piston 62, connecting neck 66, guide piston 67 and reduced stem 68 together constitute a rod-like valve unit.

In the embodiment shown in Figures 3 and 4 the area of the valve seat 65 is very slight, the difference in diameter between the valve piston 62 and guide piston 67 being about one-fortieth smaller than the diameter of the piston 62. Instead of making the piston 62 and the piston 67 of slightly different diameters the construction shown in Figure 5 may be employed from which it will be seen that the piston 65ª is short and does not move in the bore of the valve stem guide but has a portion 62ª reduced to the same diameter as that of the piston 67ª. In this case the pressure of the fluid passed through the valve will act exactly equal in both directions and the valve thus be fully balanced.

In the use of the invention the pressure of the relatively light springs 35 or 72 as the case may be, is sufficient to keep the valve seated. In a valve designed for five thousand pounds line pressure a five pound spring is sufficient for the purpose.

When it is desired to open the valve it is only necessary to lift the connector 37 or 73 to raise the valve face 25 or 65 from their respective seats as the case may be. The moment this occurs fluid will flow from the inlet to the outlet passage of the valve body and the pressure of the fluid against the valve is equal in both directions. Hence all the power necessary to move the valve from the closed to the open position is that required to overcome its inertia plus the resistance of the light spring.

From the foregoing description, taken in connection with the accompanying drawing, it is thought the complete construction, operation and advantages of my invention will be clear to those skilled in the art to which it relates.

What I claim is:

1. In valves, a valve body having oppositely disposed inlet and outlet openings, and a web having a fluid passage, the axis of which is at right angles to the axes of said openings, said body having aligning bores entering from opposite ends, the axes of which bores coincide with that of said fluid passage, a stem guide in each bore, a substantially rod-like valve unit passing through said guides and bores and having a seating surface, said web having a valve seat cooperating with said surface, and packing devices in said bores around said valve unit.

2. In valves, a valve body having oppositely disposed inlet and outlet openings, and a web having a fluid passage, the axis of which is at right angles to the axes of said openings, said body having aligning bores entering from opposite ends, the axes of which bores coincide with that of said fluid passage, a stem guide in each bore, a substantially rod-like valve unit passing through said guides and bores and having a seating surface, said web having a valve seat cooperating with said surface, and packing devices in said bores around said valve unit, and means on one end of said valve unit located outside of said valve body by which said unit may be moved to seat or unseat said seating surface.

3. In valves, a valve body having oppositely disposed inlet and outlet openings, and a web having a fluid passage, the axis of which is at right angles to the axes of said openings, said body having aligning bores entering from opposite ends, the axes of which bores coincide with that of said fluid passage, a stem guide in each bore, a substantially rod-like valve unit passing through said guides and bores and having a seating surface, said web having a valve seat cooperating with said surface, packing devices in said bores around said valve unit, and means on one end of said valve unit continuously tending to seat said valve unit.

4. In valves, a valve body having oppositely disposed inlet and outlet openings, and a web having a fluid passage, the axis of which is at right angles to the axes of said openings, said body having aligning bores entering from opposite ends, the axes of which bores coincide with that of said fluid passage, a stem guide in each bore, a substantially rod-like valve unit passing through said guides and bores and having a seating surface, said web having a valve seat cooperating with said surface, packing devices in said bores around said valve unit, means on one end of said valve unit located outside of said valve body by which said unit may be moved to seat or unseat said seating surface, and means on one end of said valve unit continuously tending to seat said valve unit.

5. In valves, a valve body having oppositely disposed inlet and outlet openings, and a web having a fluid passage, the axis of which is at right angles to the axes of said openings, said body having aligning bores entering from opposite ends, the axes of which bores coincide with that of said fluid passage, a stem guide in each bore, a substantially rod-like valve unit passing through said guides and bores and having a seating surface, said web having a valve seat cooperating with said surface, and packing devices in said bores around said valve unit, said packing devices each comprising a washer supporting ring on said stem guide, a U-shaped flexible washer laid over said ring, a washer follower, and means to hold said follower against said washer and said washer in place on said ring.

6. In valves, a valve body having oppositely disposed inlet and outlet openings, and a web having a fluid passage, the axis of which is at right angles to the axes of said openings, said body having aligning bores entering from opposite ends, the axes of which bores coincide with that of said fluid passage, a stem guide in each bore, a substantially rod-like valve unit passing through said guides and bores and having a seating surface, said web having a valve seat cooperating with said surface, and packing devices in said bores around said valve unit, said valve unit comprising a valve piston operating in one stem guide and carrying said valve seating surface, a guide piston operable in the other stem guide, a connecting neck between said pistons, and stems projecting from said pistons to the outside of said valve body.

7. In valves, a valve body having oppositely disposed inlet and outlet openings, and a web having a fluid passage, the axis of which is at right angles to the axes of said openings, said body having aligning bores entering from opposite ends, the axes of which bores coincide with that of said fluid passage, a stem guide in each bore, a substantially rod-like valve unit passing through said guides and bores and having a seating surface, said web having a valve seat cooperating with said surface, and packing devices in said bores around said valve unit, said valve unit comprising a valve piston operating in one stem guide and carrying said valve seating surface, a guide piston operable in the other stem guide, a connecting neck between said pistons, said valve piston having an operating stem projecting to the outside of said body, said guide piston including a reduced stem, an auxiliary tubular stem for receiving said reduced stem and means securing said reduced stem and said tubular stem together, said tubular stem projecting to the outside of said valve body.

8. In valves, a valve body having oppositely disposed inlet and outlet openings, and a web having a fluid passage, the axis of which is at right angles to the axes of said openings, said body having aligning bores entering from opposite ends, the axes of which bores coincide with that of said fluid passage, a stem guide in each bore, a substantially rod-like valve unit passing through said guides and bores and having a seating surface, said web having a valve seat cooperating with said surface, and packing devices in said bores around said valve unit, said valve unit comprising a valve piston operating in one stem guide and carrying said valve seating surface, a guide piston operable in the other stem guide, a connecting neck between said pistons, said valve piston having an operating stem projecting to the outside of said body, said guide piston including a reduced stem, an auxiliary tubular stem for receiving said reduced stem and means securing said reduced stem and said tubular stem together said tubular stem projecting to the outside of said valve body, and adjustable tension spring means on said auxiliary stem.

FRANK HENNEBÖHLE.